UNITED STATES PATENT OFFICE.

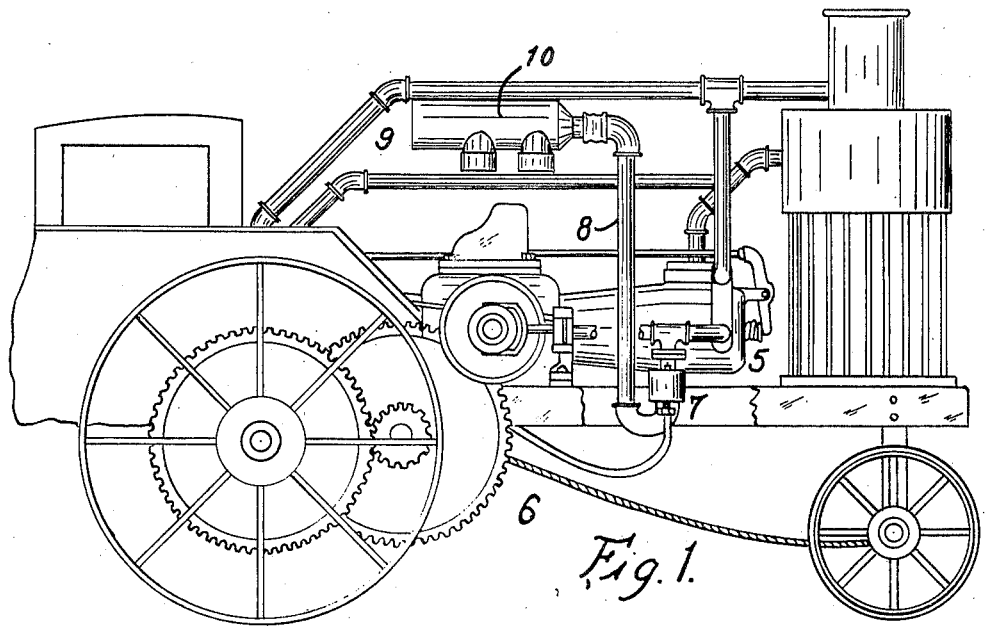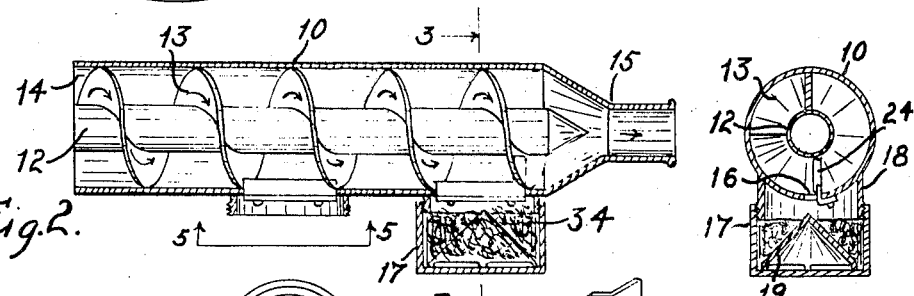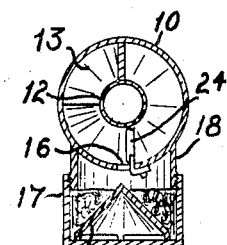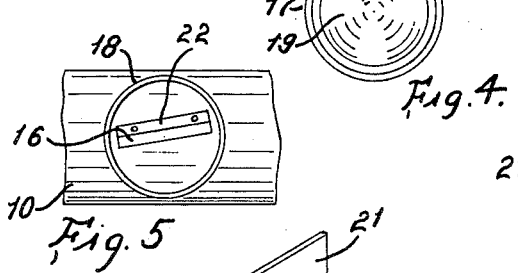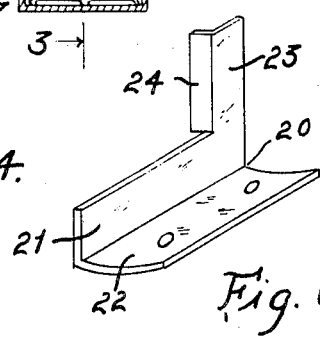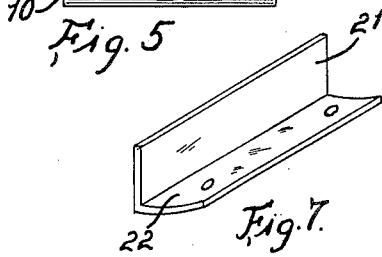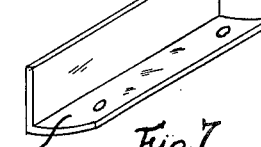

PAGE M. BRERETON, OF DENVER, COLORADO.

DUST COLLECTOR FOR INTERNAL-COMBUSTION ENGINES.

1,411,606.  Specification of Letters Patent.  Patented Apr. 4, 1922.

Application filed May 3, 1919. Serial No. 294,491.

*To all whom it may concern:*

Be it known that I, PAGE M. BRERETON, a citizen of the United States, residing at the city and county of Denver and State of Colorado, have invented certain new and useful Improvements in Dust Collectors for Internal-Combustion Engines; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to improvements in dust collectors for internal combustion engines, my object being to provide means for removing the dust and other solid particles of matter from the air which supplies the carburetor and which unites with the vapor of the fuel-liquid to form the explosive mixture which is supplied to the cylinders for operating purposes.

While this device may be used in connection with any internal combustion engine, it is more especially adapted for use with those employed on motor vehicles, and still more particularly with reference to the engines of tractors, since these machines are employed under circumstances where there is usually a large amount of dust, and, owing to the great power required in operating them, the wear upon the cylinders and pistons is of greater magnitude than where these engines are used in other relations. In fact, I have known of at least one instance where the engine of a valuable tractor was ruined in a single day by the dust which went into the cylinders of the engine through the carburetor.

In my improvement, I employ a device consisting of a tube and a central core therein, spaced by a spirally arranged blade, which forms a spiral passage through the tube, which is open to the atmosphere at one extremity and in communication with the carburetor at the opposite extremity, and therefore susceptible through the medium of the carburetor, to the vacuum condition produced in the cylinders of the engine during the suction movement of the pistons. This tube is further provided with one or more slots or openings adjacent which is located a riffle or deflector, which serves to cause the dust, which is carried outwardly by centrifugal force, toward the inner surface of the tube by the movement of the air in the spiral path while passing through the tube, to pass through the slot or opening into a receptacle connected with the tube, and which may be termed a "dust-catcher". Since all of the air which supplies the carburetor passes through this tube, there is a possibility of catching practically all of the dust, or at least such a proportion as will relieve the engine from undue wear resulting from the entrance of dust and other foreign particles of matter, as heretofore explained.

Having briefly outlined my improvement, as well as the function it is intended to perform, I will proceed to describe the same in detail, reference being made to the accompanying drawing, in which is illustrated an embodiment thereof. In this drawing:

Figure 1 is an elevation of a tractor, equipped with an internal combustion engine whose carburetor is connected with my improved dust collector.

Fig. 2 is a vertical, longitudinal section taken through the dust collector.

Fig. 3 is a section taken on the line 3—3, Fig. 2, looking toward the right.

Fig. 4 is a top plan view in detail of the dust-catching member.

Fig. 5 is a fragmentary view of the dust collector, viewed in the direction of arrows 5, Fig. 2.

Fig. 6 is a perspective view of one form of riffle, or device for deflecting the dust during its passage through the tubular member of the dust collector.

Fig. 7 is a similar view of another form of riffle.

The same reference characters indicate the same parts in all the views.

Figure 8:
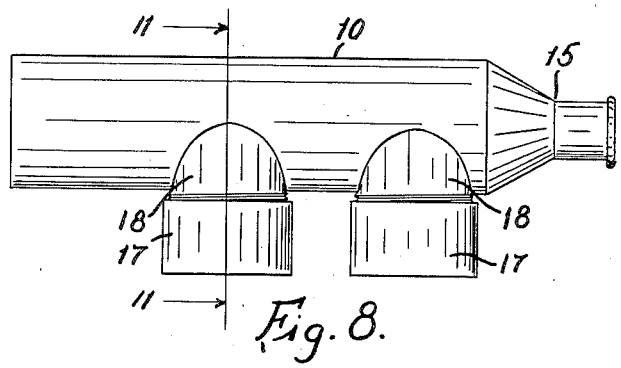
Fig. 8 is an elevation of my improved dust collector, equipped with two dust-catching devices.
Figure 9:
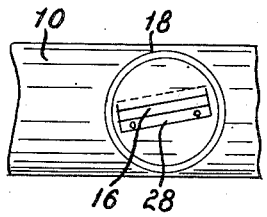
Fig. 9 is a fragmentary view of the dust collector, viewed in the direction of arrows 9, Fig. 11.

Let the numeral 5 designate an internal combustion engine, mounted upon a motor vehicle 6 of the tractor type. The carburetor 7 of the engine may be of any suitable or ordinary construction, and its air inlet is connected by means of a pipe 8 with my improved dust collector 9, which consists of a tube 10, in which is centrally supported a core 12, the tube and core being annularly spaced by a spirally arranged plate 13, which forms a spiral passage through which the air which enters the tube at its larger extremity 14, passes, and which finally escapes through the reduced funnel-shaped extremity 15, the said air passing thence to the carburetor through the pipe 8.

The tube is provided, preferably at its lowermost part, with one or more elongated openings or slots, 16, which are in communication with the dust-catching receptacle 17, which is screwed to a nipple 18, formed integral with the tube, the receptacle having located therein a cone-shaped trap 19, having its apex uppermost, its base being supported from the bottom of the receptacle to allow the dust to work thereunder and into the trap, which is hollow for the purpose.

Arranged adjacent each slot 16 is a deflecting riffle 20, which may be of any suitable or desired construction. As shown in Figs. 2 and 3 of the drawing, the riffle is of the construction illustrated in Fig. 6, and consists of an upwardly projecting part 21, which passes through the slot and extends into the tube, this riffle having a flange 22, arranged approximately at right angles to the part 21, and which engages the curved outer surface of the tube, being perforated to receive fastening devices, whereby it is secured to the tube. The part 21 has at its forward extremity, or that nearer the air-exit extremity of the tube, an upwardly-projecting extension 23, which reaches to the core 12 of the device, this extension having a right-angular flange 24, which extends inwardly and laterally from the member 21.

As illustrated in Figs. 2 and 3, this riffle or deflecting member is arranged at the side of the slot which is reached first by the air current in its spiral passage through the tube and which may be termed the inlet side of the slot. As the dust-laden air reaches this riffle or deflecting member, the dust or other solid particles of matter are interrupted in their passage and by virtue of the eddying currents of air, will climb up the adjacent surface of the part 21 and drop downwardly through the slot or opening 16 into the dust-catcher 17, where it will be trapped.

In Fig. 2 of the drawing, two slots or openings 16 are employed. These slots are directed at right angles, or perpendicular to the air current, while taking its spiral path through the tube. In connection with the rearmost slot in Fig. 2, the simple form of deflecting riffle is employed having the member 21 with the auxiliary part 23.

Figure 12:
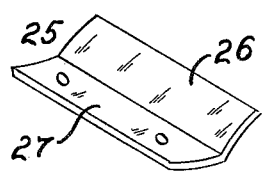
Fig. 12 is a perspective view of the form of riffle or deflector shown in Fig. 11.
Figure 11:
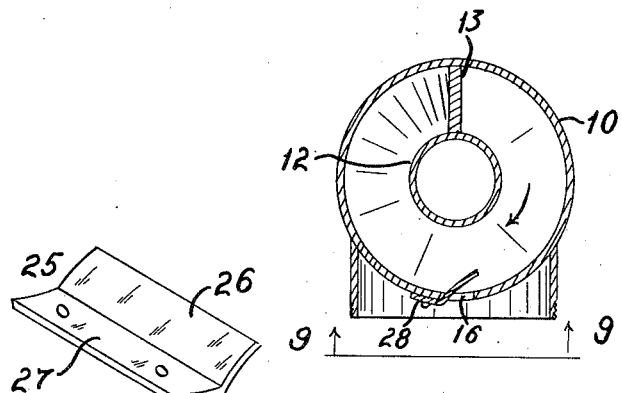
Fig. 11 is a section taken on the line 11—11, Fig. 8, viewed in the direction of the arrows.

Again, in the form of construction shown in Figs. 11 and 12 still another form of riffle or deflecting member, which I will designate in its entirety by the numeral 25, is employed. This member has a forwardly directed or inclined member 26 formed integral with which is a securing flange 27, which is fastened to the outer surface of the tube, as shown at 28. Furthermore, this deflecting member is arranged on the opposite side of the slot from that shown in Fig. 3. Hence, the dust which is presumably following the inner surface of the tube during its spiral passage therethrough, will be directed downwardly through the slot 16 in the first instance, passing finally into the dust catcher.

Figure 13:
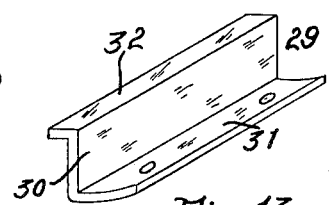
Fig. 13 shows still another form of dust-deflecting riffle.

In Fig. 13 I have illustrated still another form of dust-deflecting member, which I will designate by the numeral 29. In this case the part 30, which extends upwardly into the tube from the slot, in addition to the fastening flange 31, is provided at its upper edge with a longitudinal part 32, which is formed approximately at right angles to the part 30. This part 32 is intended to aid in the deflection of the dust through the opening in the tube, whether it is placed at the forward or rear edge thereof, these terms being used with reference to the direction of the travel of the dust-laden air through the tube on its way to the upper extremity of the pipe 8.

Figure 10:
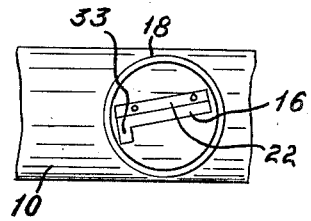
Fig. 10 is a similar view, showing a slightly modified form of construction.

In Fig. 10, the slot or opening 16 of the tube has a part 33, which extends substantially at right angles to the main portion thereof.

It will be understood that the invention is not limited to the exact shape or size of the opening through which the dust is passed into the catcher box or receptacle 17. From the foregoing description, the use and operation of my improved device will be readily understood.

Assuming that the dust collector is connected with the machine, as illustrated in Fig. 7, as the pistons in the engine cylinders reciprocate, the vacuum produced in the cylinders by the movement of the pistons in one direction, will draw air into the carburetor through the tube 10. This air, together with the dust or other foreign particles of matter, will be compelled to take a spiral path through the tube, as heretofore explained. Assuming that there are two openings 16 in the tube, as illustrated in Fig. 10, as the dust strikes the deflecting riffle adjacent the rearmost opening, it will be caused to pass directly downwardly through the slot 16 into the corresponding catcher box, 17, as the riffle is arranged as shown in Fig. 11. But if the riffle is arranged as shown in Fig. 3, the dust will be checked in its travel and will move upwardly over the top of the riffle and thence downwardly through the slot into the catcher box by virtue of the eddy produced by the air in the vicinity of the slot.

Assuming that all of the dust is not removed from the air by the first deflecting riffle and caught in the corresponding catcher box, the riffle adjacent the next opening 16 will act upon the remaining portion of the dust or foreign particles of matter in a similar way. It will, of course, be understood that as the air current follows the spiral channel between the core 12 and the tube 10, the whirling action will produce centrifugal force which will cause the dust and other foreign particles of matter with which the air may be laden, to seek the inner surface of the tube by reason of which fact it is considered that a very large proportion of the dust in the air will encounter the deflecting riffles, with the result that the dust will be precipitated and caught in the catcher boxes before the air reaches the carburetor.

I prefer to place a loose packing 34 of steel wool or other suitable material in each catcher box around the cone-shaped trap. Its function is to decrease the speed of the air current entering the catcher box with the dust, to aid in the deposition of the dust and to act to some extent as a strainer of the air.

In explanation of the function of the parts 23 and 24 of the preferred form of dust deflector shown in Fig. 6, I found in practice that the air column, in taking its spiral path through the tube, was inclined to ride up on the spiral plate 13 toward the core, at the forward end of the slot or opening 16, and by extending the part 23 at the corresponding extremity of the deflector, upwardly to the core and forming the flange 24 thereon, I propose to catch a portion of the dust which would otherwise escape, as the dust in striking the plate 13 adjacent the part 23, will form an eddy and be carried by the air current around the flange 24 and will pass thence downwardly into and through the opening 16 into the catcher box.

I claim:

1. A dust collector for internal combustion engines, comprising a tube, a spiral member positioned therein to form a spiral passage for air, the tube being open at one end for intake of air and open at the other end for connection with an engine, a dust collector secured to the outer side of the tube, a narrow opening in the tube between the spiral passage and the collector, said opening extending transversely of the respective convolution of the spiral passage and longitudinally of the tube, said opening being confined by the adjacent walls of said member forming a single convolution of said passage, said collector being sealed against suction, and a riffle mounted at the side of said narrow opening to cause deflection of dust through the opening into the collector, said riffle having an extension projecting inwardly toward the center of the tube and engaging the spiral member on the engine side of the respective convolution of said spiral passage.

2. A dust collector for internal combustion engines, comprising a tube, a core within the tube, a spiral member positioned between the tube and the core whereby a spiral passage for air is formed between said parts, the tube being open at one end for intake of air and open at the other end for connection with an engine, a dust collector secured to the outer side of the tube, the tube having a narrow opening therein confined by the adjacent walls of said spiral member forming a single convolution of said spiral passage, said opening constituting means for communication between the collector and the passage, said collector being sealed against suction, and a riffle mounted at one side of said opening to cause deflection of dust through the opening into the collector, said riffle having an extension projecting inwardly to said core and engaging the spiral member on the engine side of the respective convolution of said spiral passage.

3. A dust collector for internal combustion engines, comprising a tube, a core within the tube, a spiral member positioned between the tube and the core whereby a spiral passage for air is formed between said parts, the tube being open at one end for intake of air and open at the other end for connection with an engine, a dust collector secured to the outer side of the tube, the tube having a narrow opening therein confined by the adjacent walls of said spiral member forming a single convolution of said spiral passage, said opening constituting means for communication between the collector and the passage, said collector being sealed against suction, and a riffle mounted at one side of said opening to cause deflection of dust through the opening into the collector, said riffle having an extension projecting inwardly to said core and engaging the spiral member on the engine side of the respective convolution of said spiral passage, the end of said opening opposite said extension being enlarged.

4. A dust collector for internal combustion engines comprising a tube, a core within the tube, a spiral member positioned between the tube and the core, whereby a spiral passage for air is formed between said parts, the tube being open at one end for intake of air and open at the other end for connection with an engine, a dust collector secured to the outer side of the tube, the tube having a narrow opening therein confined between the adjacent walls of said spiral member which form a single convolution of said spiral passage, said opening constituting means for communication between the collector and the passage, and a riffle mounted at one side of said opening to cause deflection of dust through the opening into the collector, said riffle having an extension projecting inwardly toward said core and engaging the spiral member on the engine side of the respective convolution.

In testimony whereof I affix my signature.

PAGE M. BRERETON.